(12) United States Patent
Klein et al.

(10) Patent No.: US 11,671,273 B2
(45) Date of Patent: Jun. 6, 2023

(54) MACHINE-LEARNED SMART HOME CONFIGURATION

(71) Applicant: Adomi, Inc., San Mateo, CA (US)

(72) Inventors: Alon Klein, Herzliya (IL); Binyamin Gil, Rehovot (IL)

(73) Assignee: VEEV GROUP, INC., San Mateo, CA (US)

( * ) Notice: Subject to any disclaimer, the term of this patent is extended or adjusted under 35 U.S.C. 154(b) by 284 days.

(21) Appl. No.: 16/568,850

(22) Filed: Sep. 12, 2019

(65) Prior Publication Data

US 2020/0092125 A1    Mar. 19, 2020

Related U.S. Application Data

(60) Provisional application No. 62/733,082, filed on Sep. 18, 2018.

(51) Int. Cl.
| | |
|---|---|
| *H04L 12/28* | (2006.01) |
| *G06N 20/00* | (2019.01) |
| *G06F 18/214* | (2023.01) |
| *G06V 20/52* | (2022.01) |

(52) U.S. Cl.
CPC ........ *H04L 12/2809* (2013.01); *G06F 18/214* (2023.01); *G06N 20/00* (2019.01); *G06V 20/52* (2022.01); *H04L 12/282* (2013.01); *H04L 12/2814* (2013.01); *H04L 12/2816* (2013.01)

(58) Field of Classification Search
CPC ............ H04L 12/2814; H04L 12/2816; H04L 12/282; G06N 20/00; G06K 9/6256
See application file for complete search history.

(56) References Cited

U.S. PATENT DOCUMENTS

| | | | | |
|---|---|---|---|---|
| 11,151,472 B2* | 10/2021 | Gopalan | ................ | G06N 20/00 |
| 2009/0319454 A1* | 12/2009 | Regli | ....................... | G06K 9/62 |
| | | | | 706/13 |
| 2015/0339591 A1* | 11/2015 | Cook | ..................... | G06N 20/00 |
| | | | | 706/12 |
| 2016/0187127 A1* | 6/2016 | Purohit | ................. | G08B 29/04 |
| | | | | 702/150 |
| 2016/0205123 A1* | 7/2016 | Almurayh | ........... | H04L 63/1425 |
| | | | | 726/23 |
| 2017/0261954 A1* | 9/2017 | Li | ....................... | H04L 12/2816 |
| 2018/0069879 A1* | 3/2018 | Epstein | .............. | H04L 12/2818 |

* cited by examiner

*Primary Examiner* — Nam T Tran
(74) *Attorney, Agent, or Firm* — Fenwick & West LLP

(57) ABSTRACT

A central hub and database for a smart home environment enable the learning of states associated with items within the smart home and the training one or more machine-learned models associated with the items. After training the machine-learned models, the central hub can modify a state of an item based on the machine-learned model associated with the item. For instance, a window can be opened or shut, a light can be dimmed or turned off, and a door can be locked. Each state of the object can be associated with a set of conditions that, when satisfied, cause the central hub to change the state of the object using the corresponding machine-learned model, for instance without receiving an explicit input from a user.

20 Claims, 7 Drawing Sheets

MACHINE-LEARNED SMART HOME CONFIGURATION

CROSS REFERENCE TO RELATED APPLICATIONS

This application claims the benefit of U.S. Provisional Application No. 62/733,082, filed Sep. 18, 2018, which is incorporated by reference in its entirety.

FIELD OF THE DISCLOSURE

The present disclosure relates to the field of home automation.

DESCRIPTION OF BACKGROUND ART

Usually the term "smart home" refers to a home that comprises one or more systems that control home-devices that are installed in the house. The home-systems may comprise systems such as but not limited to lighting, heating, air-conditioning, ventilation, security, etc. Some smart houses may further comprise automation of home appliance such as but not limited to washer machine, dryer, oven, etc. It should be noted that the terms "smart home", "smart house", "smart building", "home automation", etc. can be used interchangeably herein.

A common home automation system comprises a central-hub (CHUB) that can be referred to as a gateway. The central-hub can be configured to communicate with a plurality of sensors, in order to collect information that is required for controlling the different devices. Information such as but not limited to the temperature and the humidity in different locations in the house, the temperature and the humidity outdoor; the lighting in house and outdoor, etc. On the other hand the central-hub can be configured to activate lights, relays, switches, etc. in order to control the different devices, such as but not limited to air-conditioning, lighting, security, etc.

The central-hub, the plurality of devices and sensor can be connected in a Local-Area Network (LAN) or in a wireless LAN using communication protocol such as but not limited to Wi-Fi. There are smart houses in which the central-hub may be configured to communicate with one or more servers that reside at the Internet cloud using the Internet-of-Things (IoT) protocols. Wi-Fi, LAN, WLAN, Internet, and IoT are well known to a person with ordinary skill in the art and will not be further disclosed.

A tenant of a smart home may communicate with the central-hub by using a user interface device. The interface device can be a wall-mounted terminal, a smartphone, a tablet, etc. By using the interface device the user can define one or more scenes. In order to define a scene a user needs to load into the central hub a set of parameters that define the scene, then the different devices that need to be activated or deactivated during this scene, etc. The parameters may comprise parameters such as but not limited to: time, the temperature, the humidity, the state of one or more devices, etc.

An example of a scene can be "Night". The central-hub can be configured to response to a "Night" scene by turning off the lights in the house except the light in the front door and the light in the corridor, to activating the outdoor and indoor security system for example. Further, the central-hub can be configured to dim the light in the children room to a "night state" in which the intensity of the light is set to a low value, etc. Further, the central-hub can be configured to adjust the air-conditioning system to a certain temperature, to instruct the security system to activate the sensors around the house and the doors, etc.

Another example of scene can be "Return from work". Activating this scene can be done by using the mobile device of the user. During this scene, the central-hub can be configured to activate the boiler in the parents bath room, to open the garage-door, to turn on the oven, to activate the air-conditioning system, etc.

Yet, another example of a scene can be "Going-to-the-bath room". However such a scene can comprise several sub-scenes, "Going-to-the-bath room in day light" and "Going-to-the-bath room in night". During "Going-to-the-bath room in day light" the CHUB can be configured to turn on the ventilation, while during "Going-to-the-bath room in night" the CHUB can be configured to turn on the ventilation and the light in the bath room. This scene can be further complicated and may be associated with the floor ($1^{st}$ floor, $2^{nd}$ floor), the children room or the parents room, etc. Thus, a common smart-home may comprise a huge number of scenes and involve a large number of sensors, relays appliance, etc.

Further, a user of a smart home needs to maintain the existing library of scenes. Maintaining the library of scenes may comprise correcting errors, such as the intensity level of the light in the children room during "Night" scene, etc. Adding new scenes each time a change occurs, a change such as but not limited to adding a new appliance, etc. Defining, loading and maintaining the library of a plurality of scenes is time consuming, boring and reduces the user experience. Furthermore, some existing home-automation systems require a technician for amending or adding a scene.

BRIEF SUMMARY

The needs and the deficiencies, which are disclosed above for adapting a smart home to the requirements of its residents, are not intended to limit the scope of the inventive concepts of the present disclosure in any manner. The needs are presented for illustration only. It should be noted that the terms "resident", and "tenant" may be used interchangeably herein.

The present disclosure relates to a novel technique for adjusting a smart-home to the ongoing requirements of its tenants. By using the novel technique the plurality of cases and the actions, which are involved in each case, are defined automatically with minimal involvement of the tenants. A case can be defined as a set of events that correlate and occur from time to time.

Example embodiments of the novel technique may comprise two types of systems, a cloud-system (CSYS) and a home-system (HSYS). The CSYS can reside over the World-Wide-Web (WWW) and can be communicatively coupled with one or more HSYSs, within the existing Internet infrastructure. The communication between the CSYS and the one or more HSYS can be based on communication protocol that is used by IoT. An example protocol can be Hypertext-Transfer-Protocol (HTTP), another example can be Message-Queuing-Telemetry-Transport (MQTT), etc.

An example of HSYS can comprise a central-hub (CHUB), a plurality of indoor and outdoor sensors, switches, one or more cameras, relays, SCRs, TRIACs, etc. The central-hub can comprise one or more processors that are embedded in one or more mini-personal-computer such as Intel NUC, wherein NUC stands for Next-Unit-of-Computing. Other embodiments of HSYS may use other type of computers. SCR and TRIAC are solid-state electrically controlled switches. SCR stands for Silicon-Controlled-Rectifier and TRIAC stands for Triode-for-Alternating-Current.

The HSYS may use PoE (Power over Ethernet) in order to communicate with a plurality of indoor and outdoor sensors, cameras, switches, relays, TRIACs, SCRs, appliances as well as delivering power to some of those units. Along the disclosure and the claims the terms solid-state or semiconductor may be used interchangeably. Intel-NUC, PC, SCRs and TRIACs are well known to a person with ordinary skill in the art and will not be further disclosed.

In addition the HSYS may comprise wireless communication capabilities. The wireless communication with the sensors, cameras, lighting control, thermostats, windows, locks, swimming pools, garage door openers, etc. can be based on Wi-Fi or Z-Wave protocols, for example.

Some of the indoor and outdoor sensors can combine two or more sensors together and senses two or more parameters of the environment. Further some of the sensors can be energized by using internal batteries. Furthermore, some of the sensors can be associated with the central-hub by using wireless communication based on Z-Wave or Wi-Fi protocols. An example of such a combined sensor can be "MultiSensor 6". "MultiSensor 6" can deliver information regarding motion, temperature, humidity, light, vibrations, and ultraviolet light (UV) as well as wireless communication based on Z-Wave protocol. "MultiSensor 6" is a trade name of Aeotec Inc USA. Wi-Fi and Z-Wave protocols are well known to a person with ordinary skill in the art and will not be further disclosed.

An example of a CSYS can be associated with a plurality of smart-homes. The CSYS can comprise a Front-End (FE), one or more databases (DBs); one or more machine-learning-computers (MLC) and one or more of additional servers. The one or more DBs can be used for storing historical data that was obtained from the HSYSs that are associated with the CSYS. The additional servers may comprise billing server, support server, web interface server, etc. The FE can be configured to communicate with the plurality of HSYSs, and domains over the Internet that can add information that can contribute to the automatic operation of the smart-home. Domains such as but not limited to domains that forecast the weather for the next few days; or domains that can deliver information regarding a certain appliance, etc.

An example of an MLC can be a high-end computer with powerful Graphical-Processing Unit (GPU) that is configured to execute one or more machine learning programs (MLP) in order to learn the features of each associated smart-home, the habits and needs of the tenants of each of the associated smart-home. Some embodiments of the novel technique can be configured to process the stored data that has been collected from a certain smart home, to classify the data into a set of cases, a set of actions taken in each case and to identify the events that lead to switch from one case to another case. Next this processed data and programs can be downloaded via the FE toward the CHUB of the relevant smart home. A non-limiting example of a powerful computer can be "Amazon EC2 P3 Instances" maintained by Amazon Crop USA and a non-limiting example of a MLP can be based on "TensorFlow" maintained by Google Bain Team USA.

In another example embodiment of the disclosed technique, the MLC can be configured to process the stored data that has been collected from a certain smart home and to classify the data according to: devices or items that are associated with that smart home, the actions that were taken per each item, data from sensors, etc. The MLC would identify the events that lead to switch from one state to the other of each device. Then, the processed data and programs can be downloaded via the FE toward the CHUB of the relevant smart home. Along the present disclosure the terms item and device can be used interchangeably.

The operation of an example embodiment of HSYS may comprise several phases: definition-and-configuration phase, data-collecting phase, initial processing phase (IPP), and ongoing phase. During the definition-and-configuration phase one of the residents or a technician of the vendor of the HSYS can appoint himself as the administrator of the HSYS. The administrator (ADMIN) identification and credential can be photograph by one or more cameras and microphones that are embedded in the HSYS and are associated with the CHUB. In addition, the administrator can say one or more phrases in order to enable the CHUB to analyze and learn the voice signature of the administrator.

During the definition-and-configuration phase, the ADMIN can load to the CHUB information related to the relevant home. Information such as but not limited to the number of floors, the rooms/spaces in each floor, the corridors, etc. The ADMIN may load outdoor information such as but not limited to the garage, swimming pool, gates, etc. In addition, the ADMIN may introduce the other tenants of the smart home by using one or more cameras that are installed in the smart home.

In each room the ADMIN may point on relevant devices (A/C, oven, etc.) as well as the sensors and cameras that are installed in that room. Finally images of the cars that are related to the smart home can be taken by one or more outdoor cameras and be loaded to the CHUB.

At the end of the definition-and-configuration phase, the ADMIN may instruct the CHUB to create an association-list that associates the device identifier, such as but not limited to the MAC address of each device with the type of the device (an A/C unit, an oven, a lighting switch, light sensor, etc.), its location in the house (dining room, $1^{st}$ floor bath room, parents room, boys room, etc.). The association between the devices and their MAC address can be implemented by connecting one cable at a time to the Ethernet Switch that is installed between the devices and the CHUB, for example. Creating the association-list and transmitting it toward the FE of the CSYS can indicate the end of the definition-and-configuration and the beginning of the data-collecting phase.

The collected data can be organized and stored in sections. The sections can be organized according to location (dining room, kitchen, etc.) and may comprise the reading from each one of the sensors/cameras as well as indication on the operation of each device in that location. Collecting the data can be done periodically, every few tens of minutes, 20 minutes for example, or can be trigger by an event. An event can be "activating the door of the garage", "Wakening of a parent", "eating breakfast", etc. . . .

At a certain time of the day, at the hour 23:59 for example, the CHUB can be configured to transmit the stored data that was collected during that day toward the FE of the CSYS. In an alternate embodiment, the CHUB can be configured to transmit the stored data toward the FE of the CSYS at the end of each event. The FE can be configured to store the obtained data in the DB of the CSYS in a section that was allocated to the relevant home. The data-collecting phase can continues few weeks, four five weeks for example.

In some embodiments, the data-collecting phase can continue until a predefine number of events had been collected. The predefine value can be in the range of few hundreds, five hundreds for example. Other example embodiments can be configured to "store and forward" the collected data. "Store and forward" is a telecommunications technique in which information is sent to an intermediate station where it is kept and sent at a later time to the final destination or to another intermediate station. "Store and forward" is well known technique for a person with ordinary skill in the art and will not be further disclosed.

Next, the initial-processing phase (IPP) can be initiated. During the IPP the one or more MLCs that are located in the CSYS can process the stored data in order to classify a plurality of cases that can be related to that house. Per each case, the MLC can define a set of conditions that are required in order to define the beginning and the end of the case. Each condition can be weighted with an associated coefficient. Further, per each case the MLC may define a set of statistical models that are configured to predict a set of actions to be taken by the CHUB as well as the order in which the actions can be activated.

For example, a case of "Approaching-Home" can be initiated by sending an instruction from the cellular phone of the driver. Some embodiments may trigger this case automatically based on indication from the Global-Positioning-System (GPS) that is associated with the driver's mobile phone. The predicted actions can comprise: open the gate for the car, open the garage door, activate the light in the garage, determine that the car is in the garage, close the car gate, close the garage door turn on the light above the door between the garage and the kitchen, turn off the light in the garage and turn on the light in the kitchen. The event of the driver-entered-the-kitchen may terminate the case of "Approaching-Home".

Another example case can be "Morning". This case can be initiated by the CHUB upon getting information from its internal clock that the time is 7:00 AM, for example. An alternate embodiment may initiate the "Morning" case based on learning the collected information about indoor lighting and outdoor lighting, etc. The predicted set of actions may comprise: deactivating the indoor security system, turn on the light in the bath room, open the blinds in the kitchen and the dining room, activate the A/C system, etc.

Based on learning the collected data, the HSYS can learn to terminate the "Morning" case can be terminated upon determining that the last person left the house. Alternatively, the decision can be based on time, or the number of people that went out from the main door, or indication from the IR sensors or environmental sensors like $CO_2$ sensors, or by any combination of those events, etc. The actions that can be associated with the decision that the house is empty can comprise: to active the indoor and outdoor security system, to turn off the A/C system, to turn off all the light, etc.

Other example of a case can be watching TV. In such a case the MLC may learn to adjust the light according to the user habits, turn on the A/C system in the TV room, etc.

At the end of the IPP the relevant MLC may download to the CHUB of the relevant home a plurality of statistical model for classifing cases, the conditions for selecting each case and the predicated actions to be taken during each case. The download process can be implemented via the FE of the CSYS. The download process terminates the IPP and initiates the ongoing phase.

During the ongoing phase, the CHUB can be configured to determine the current case and to execute the relevant actions that are related to that case. For example, during a "Morning" case, the CHUB may start implementing the predicted actions that are associated with the "Morning" case. The CHUB can be configured to collect feedback from the residents of the house. The feedback can be changing one or more actions that are predicted in one or more cases; changing one or more conditions that define one or more cases, etc. Example embodiments of the MLCs can be configured to allocate a high probability coefficient to the tenant corrections.

Some embodiments of the present disclosure may use additional phase in between the processing phase and the ongoing phase. The additional phase can be referred as a verifying-sub-phase. The purpose of the verifying-sub-phase is to verify that the downloaded classified cases; the conditions for activating each case and the predicated actions to be taken during each case meets the real live at that smart home.

During the verifying-sub-phase the system operates as in on-going phase, but with increased sensitivity to human interactions and corrections. In addition the human interaction gets higher statistical coefficient in the algorithm that is used for predicting the appropriate actions. Thus, the verifying-sub-phase enables fine tuning of the classified cases; the conditions for activating each case and the predicated actions to be taken during each case.

Some example embodiments of the disclosed technique can be configured to operate according to items (items-oriented methods) and not according to cases (cases-oriented method). In such embodiment the definition-and-configuration phase and the data-collecting phase can be similar to corresponding phases of cases oriented embodiments. However the IPP and the ongoing phase of the items-oriented method differ from those phases in the case-oriented method.

During the IPP the stored data can be arranged in table A in which the lines represent the time, the first column is the state of the relevant item and each of the following columns is allocated per one of the sensors or one of the switches. Then, table A can be divided into two tables A1 and A2. Next, table A1 can be searched looking for lines in which the item changes state from off to on. Those lines and a group of lines before each of those lines can be marked.

Based on the stored data in table A1 a statistical model can be created that reflects the contribution of the readings from the sensors, switches, cameras, etc. on changing the state of the device. Next, the created statistical model can be implemented on the stored data of table A2 and the predicted actions can be compared to the real actions that are stored in table A2 and the success rate (SR) of the model can be calculated.

If the SR is above a predefined threshold, then the relevant statistical model can be marked as ready to be used and be stored in the DB of the CSYS as well as be downloaded to the relevant HSYS, which can store it in the HSYS DB and can start using this model.

In case that the SR is below the predefined threshold the statistical model can be amended in order to increase the rate of success. Amending the model can be done by changing the relation between A1 and A2, increasing the data collection period, reducing the value of the threshold, etc. In some cases a decision can be made that the system fails to create an appropriate statistical mode.

Some examples of embodiments of the disclosed technique may not use a CSYS. In such embodiment the HSYS can be configured to execute the actions that are implemented by the CSYS. In such embodiments, each smart-home acts as an individual, independently from other smart-homes.

The foregoing summary is not intended to summarize each potential embodiment or every aspect of the present invention, and other features and advantages of the present invention will become apparent upon reading the following detailed description of the embodiments with the accompanying drawings and appended claims.

Furthermore, although specific exemplary embodiments are described in detail to illustrate the inventive concepts to a person having ordinary skill in the art, such embodiments can be modified to various modifications and alternative forms. Accordingly, the figures and written description are not intended to limit the scope of the inventive concepts in any manner.

Other objects, features, and advantages of the present invention will become apparent upon reading the following detailed description of the disclosed embodiments with the accompanying drawings and appended claims.

BRIEF DESCRIPTION OF THE DRAWING

Exemplary embodiments of the present disclosure will be understood and appreciated more fully from the following detailed description, taken in conjunction with the drawings in which.

DETAILED DESCRIPTION OF EMBODIMENTS OF THE INVENTION

Turning now to the figures in which like numerals represent like elements throughout the several views, in which few examples of embodiments of the present disclosure are described. For convenience, only some elements of the same group may be labeled with numerals. The purpose of the drawings is to describe exemplary embodiments and not for production. Therefore features shown in the figures are chosen for convenience and clarity of presentation only. Moreover, the language used in this disclosure has been principally selected for readability and instructional purposes, and may not have been selected to delineate or circumscribe the inventive subject matter, resort to the claims being necessary to determine such inventive subject matter.

Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments may implement the features and functionality described herein in software, firmware, or hardware as desired, including any combination of software, firmware, and hardware.

In the following description, the words "unit," "element," "module" and "logical module" may be used interchangeably. Anything designated as a unit or module may be a stand-alone unit or a specialized or integrated module. A unit or a module may be modular or have modular aspects allowing it to be easily removed and replaced with another similar unit or module. Each unit or module may be any one of, or any combination of, software, hardware, and/or firmware, ultimately resulting in one or more processors programmed to execute the functionality ascribed to the unit or module.

Additionally, multiple modules of the same or different types may be implemented by a single processor. Software of a logical module may be embodied on a computer readable medium such as a read/write hard disc, CDROM, Flash memory, ROM, or other memory or storage devices, etc.

In order to execute a certain task a software program may be loaded to an appropriate processor as needed. In the present disclosure the terms task, method, process can be used interchangeably. In the present disclosure the verbs transmit, transfer or be placed in a queue can be used interchangeably. Packets that are placed in a queue are sent as soon as possible.

Figure 1:
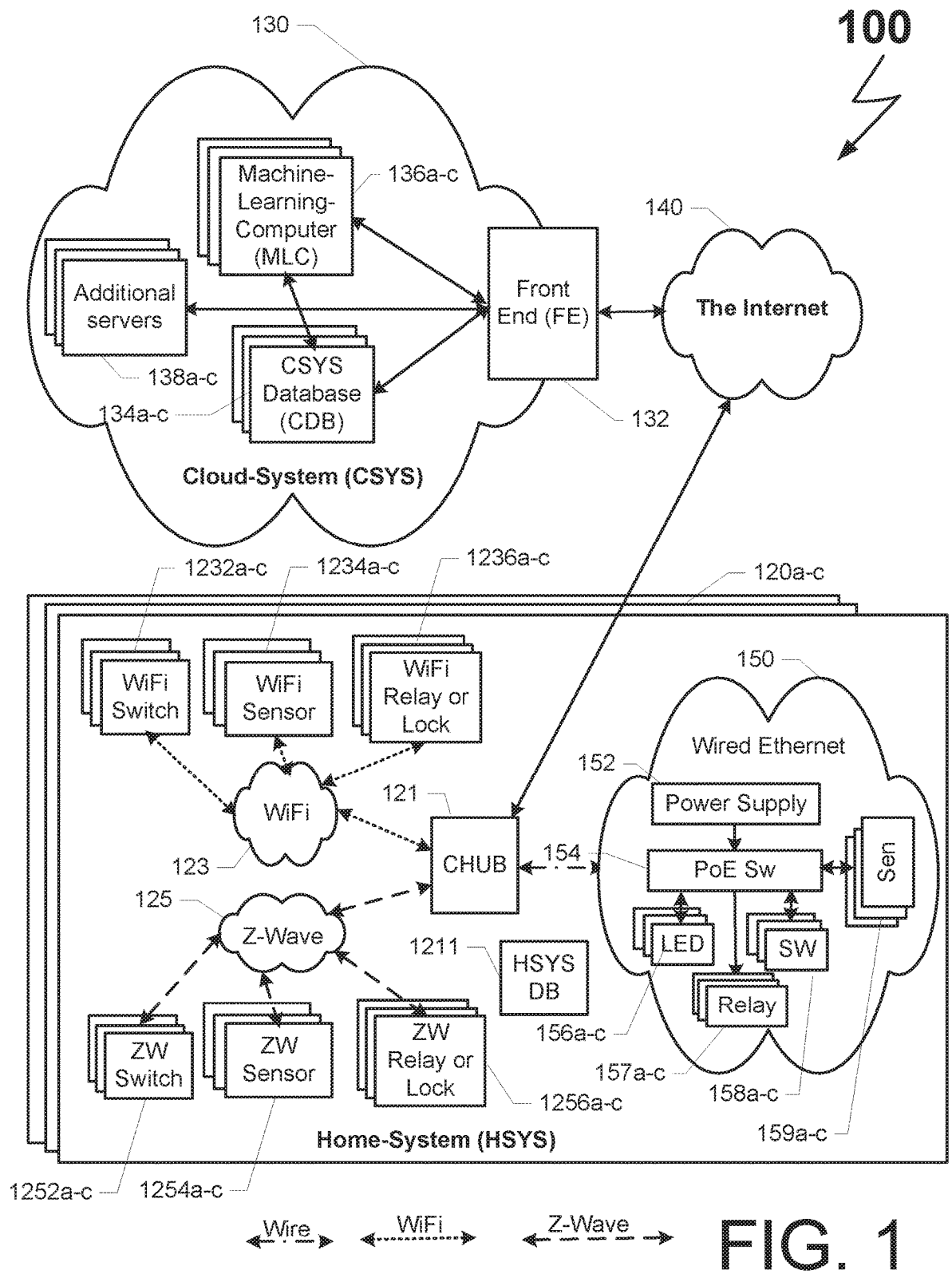
FIG. 1 illustrates a block diagram with relevant elements of an example embodiment of a novel home-automation system, that automatically prepare a set of models for predicting the actions to be taken.

FIG. 1 depicts a block diagram with relevant elements of an example of home-automation system 100 in which an example embodiment of the present disclosure can be implemented. Home-automation system 100 can be configured to create one or more statistical models that can be used to predict actions to be taken in one or more smart-homes. Home-automation system 100 can comprise a cloud-system (CSYS) 130, one or more home-systems (HSYS) 120a-c. The CSYS 130 and the one or more HSYS 120a-c can communicate via the Internet 140, by using communication protocol that can be used for IoT. An example protocol can be Hypertext-Transfer-Protocol (HTTP), another example can be Message-Queuing-Telemetry-Transport (MQTT), etc.

An example of CSYS 130 can comprise a front end (FE) 132; one or more machine-learning-computers (MLC) 136a-c; one or more CSYS databases (CDBs) 134a-c; and one or more additional servers 138a-c. The additional servers 138a-c can be used for billing, supporting, web interfaces, etc. The one or more DBs 134a-c can be used for storing historical data, current used statistical model that are related the one or more HSYSs 120a-c that are associated with the CSYS 130.

An example of FE 132 can be configured to communicate with the plurality of HSYSs 120a-c as well as domains over the Internet 140 that can contribute to the automatic operation of the plurality smart-homes. Domains such as but not limited to domains that forecast the weather for the next few days; or domains that can deliver information regarding a certain appliance, domains of security services, etc.

An example of MLC 136a-c can be a high-end computer with powerful Graphical-Processing Unit (GPU) that is configured to execute one or more machine learning programs (MLP) in order to learn the features of each associated HSYS 120a-c, the habits and needs of the tenants of each of the associated HSYS 120a-c and when to activate or deactivate one or more items.

Figure 5:
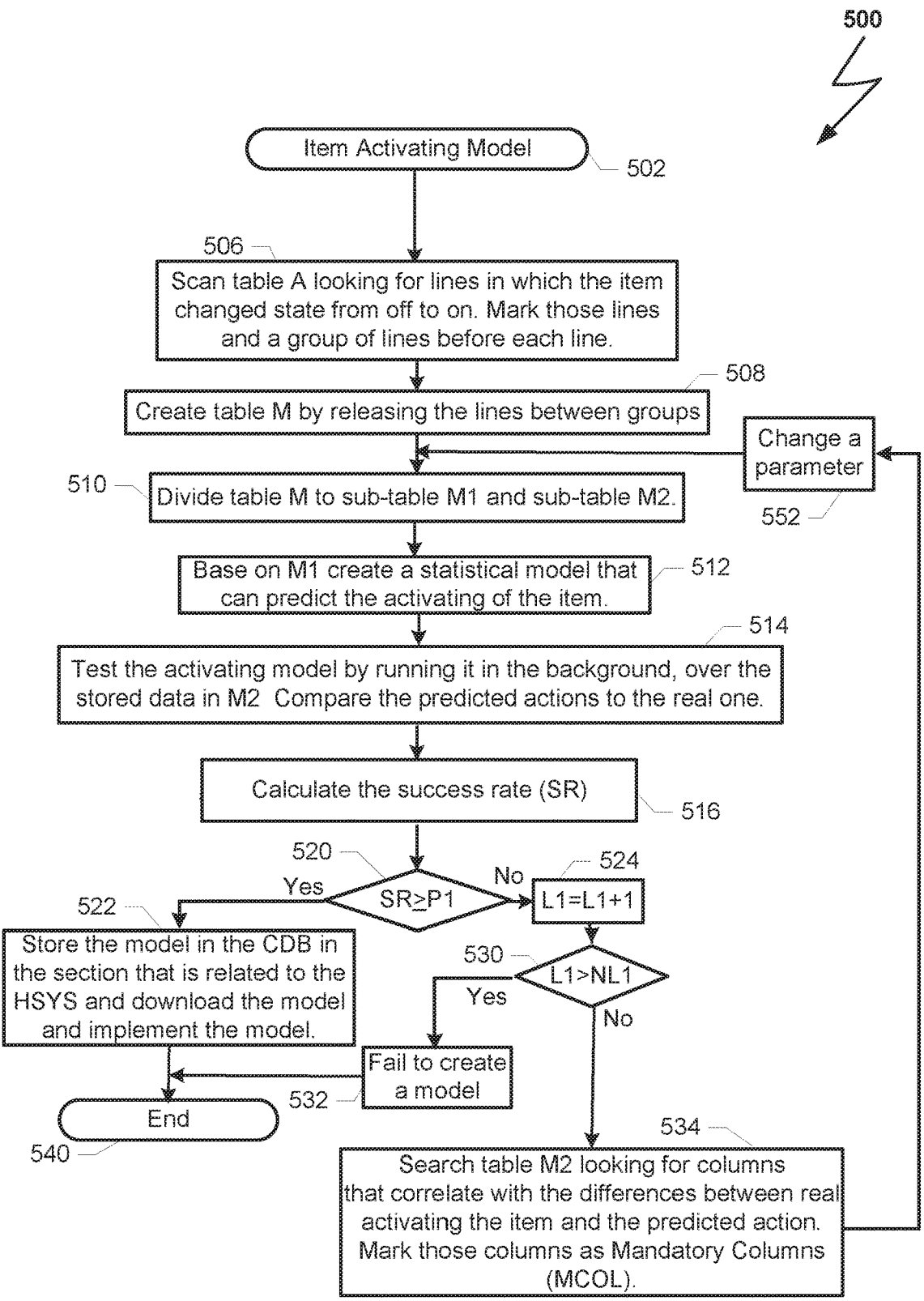
FIG. 5 illustrates a flowchart with relevant actions that can be implemented by an example of an MLC in a CSYS in order to prepare a device activating model.
Figure 6:
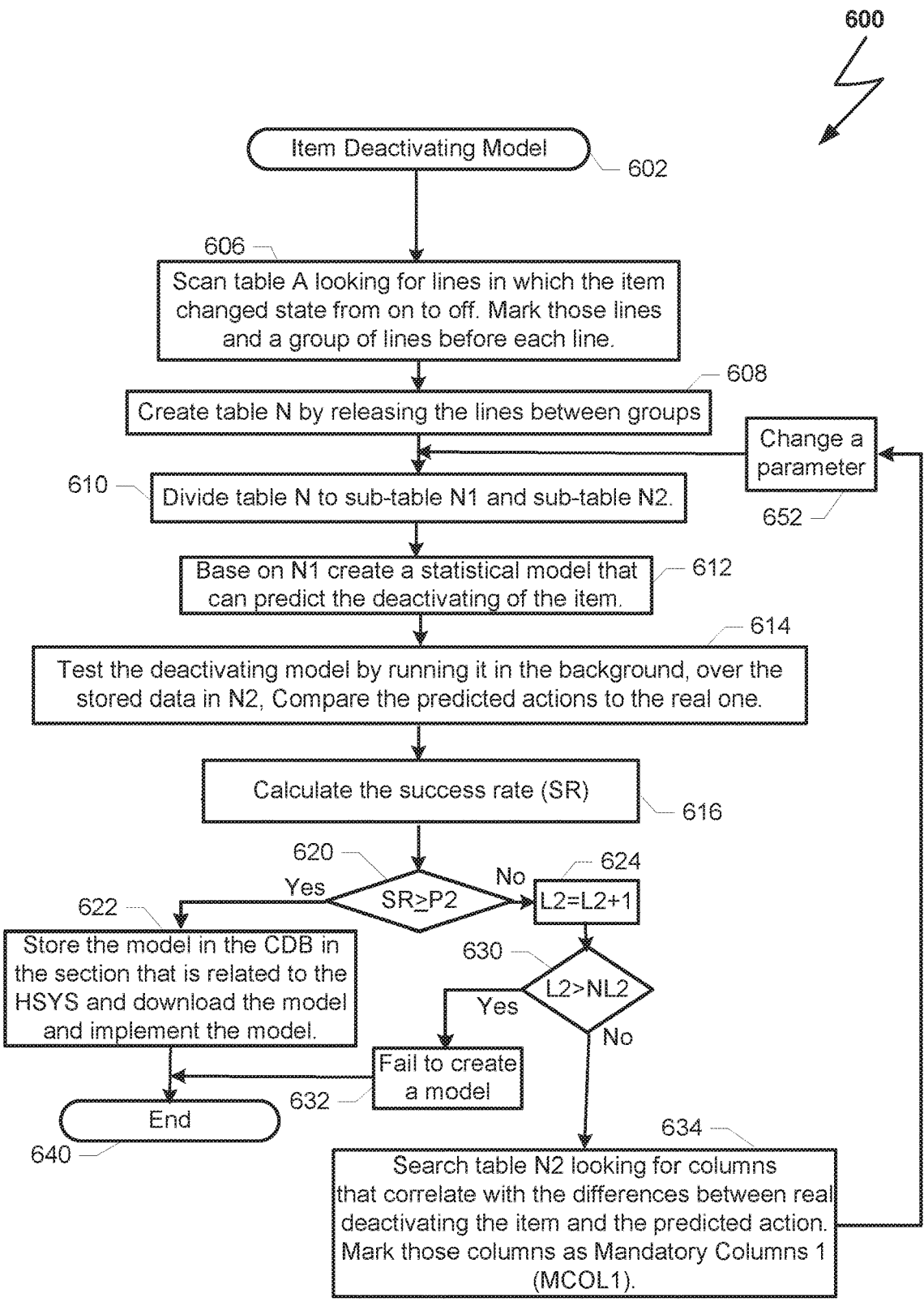
FIG. 6 illustrates a flowchart with relevant actions that can be implemented by an example of an MLC in a CSYS in order to prepare a device deactivating model.

An example embodiments of MLC 136a-c can be configured to execute one or more machine learning programs (MLP) in order to process the data that is stored in CDB 134a-c and had been collected from a certain HSYS 120a-c, to classify the data according to: devices or items that are associated with that HSYS 120a-c, the actions to be taken per each item and the cases that lead to switch from one state to the other of that device. At the end of data processing a set of one or more statistical models can be delivered. Each statistical model can predict the probability that a tenant would activate/deactivate a certain item when certain conditions occur. A non-limiting example of a MLP can be based on "TensorFlow" maintained by Google Bain Team USA. Yet, another example of MLC 136a-c can be configured to run MLPs that are configured to execute the actions that are disclosed below in conjunction with FIG. 4; FIG. 5 and FIG. 6.

An alternate example embodiment of MLC 136a-c can be configured to process the stored data that has been stored in CDB 134a-c. Data that was collected from a certain HSYS 120a-c, to classify the data into a set of cases, a set of action to be taken in each case and the event that lead to switch from one case to another case. Next, per each case the MLC 136a-c can be configured to create a statistical model that can predict which items and when it will be activated in that case and which items and when it will be deactivating during that case.

The created statistical model can be stored in CDB 134a-c in a section that is associated with the relevant HSYS 120a-c and be downloaded to the relevant HSYS 120a-c via the FE 132 and the Internet 140.

An example of HSYS 120a-c can comprise a central-hub (CHUB) 121; one or more indoor and outdoor sensors 1234a-c, 1254a-c, 159a-c; switches 1232a-c, 1252a-c, 158a-c; relays or locks 1236a-c, 1256a-c and 158a-c. The relays and switches can comprise SCRs; TRIACs; etc. The central-hub 121 can comprise one or more processors that are embedded in one or more mini-personal-computer such as Intel NUC, wherein NUC stands for Next-Unit-of-Computing. Other embodiments of HSYS 120a-c may use other type of computers. SCR and TRIAC are solid-state electrically controlled switches. SCR stands for Silicon-Controlled-Rectifier and TRIAC stands for Triode-for-Alternating-Current. Some of the sensors 1234a-c, 1254a-c, 159a-c can comprise camera, video camera, microphone, etc.

Some of the indoor and outdoor sensors 1234a-c, 1254a-c, 159a-c can combine two or more sensors together and senses two or more parameters of the environment. Further some of the sensors 1234a-c, 1254a-c, 159a-c can be energized by using internal batteries. An example of such a combined sensor can be "MultiSensor 6". "MultiSensor 6" can deliver information regarding motion, temperature, humidity, light, vibrations, and ultraviolet light (UV) as well as wireless communication based on Z-Wave protocol. "MultiSensor 6" is a trade name of Aeotec Inc USA.

The CHUB 121, the plurality of devices 1236a-c, 1256a-c and 158a-c, items such as but not limited to LEDs 156a-c and sensors 1234a-c, 1254a-c, 159a-c can be connected via one or more Local-Area Networks (LAN). The LAN can be wireless LAN using communication protocol such as but not limited to Wi-Fi (network 123), or Z-wave (network 125) or wired LAN (Ethernet 150). In some embodiment Ethernet 150 may comprise a power supply 152, a PoE switch 154 that deliver power and control to one or more LEDs 156a-c, relays 157a-c, switches 158a-c and sensors 159a-c.

There are HSYS 120a-c in which the central-hub 121 may be configured to communicate with the CSYS 130 or with one or more servers that reside at the Internet cloud 140. Such a communication can be based on one or more Internet-of-Things (IoT) protocols. Wi-Fi, Z-Wave, LAN, WLAN, Internet, and IoT are well known to a person with ordinary skill in the art and will not be further disclosed.

Some HSYS 120a-c can comprise a database, HSYSDB 1211. HSYSDB 1211 can be used to store one or more statistical models, the collected data from the plurality of sensors 1234a-c, 1254a-c, 159a-c and MLP that can be used by the CHUB 121. Some examples of embodiments of the disclosed technique may not use the CSYS 130. In such embodiment the CHUB 121 can be configured to execute the actions that are implemented by the MLC 136a-c. Some of those actions are disclosed below in conjunction with FIGS. 3-6. In such embodiments, each smart-home acts as an individual, independently from other smart-homes 120a-c.

Figure 2:
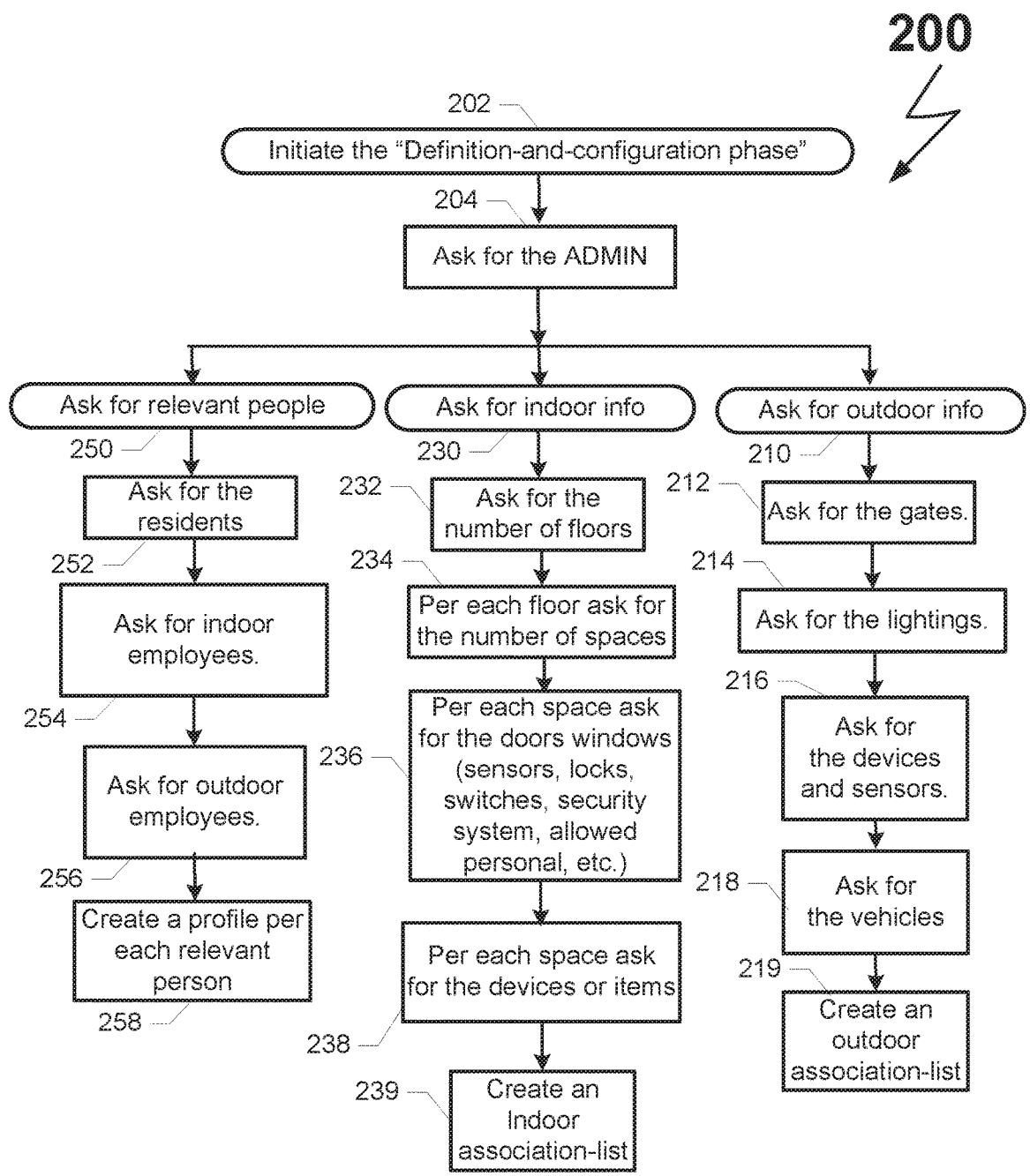
FIG. 2 illustrates a flowchart with relevant actions that can be implemented by an example HSYS leading an administrator to define and configure the HSYS to its surroundings, residents, appliances, indoor and outdoor devices, etc.

FIG. 2 illustrates a flowchart with relevant actions of an example method 200 that can be used by an example CHUB 121 of HSYS 120 (FIG. 1) for leading an administrator (ADMIN) to define and configure the CHUB 121 to the surroundings, residents, appliances, indoor and outdoor devices, etc. Method 200 can be implemented during the "Definition-and-configuration" phase. At block 204 the CHUB can ask for an ADMIN. The ADMIN can be one of the residents or a technician of the vendor of the HSYS. The ADMIN can identify himself or set the Admin's credential by using methods such as photography and/or vocal signature, for example.

Next process 200 can be divided into three branches: asking for outdoor information (blocks 210 to 219); asking for indoor information (blocks 230 to 239); and asking for information about the relevant people (blocks 250 to 256). An example process for asking outdoor information may start with block 210. At block 212 the CHUB 121 (FIG. 1) may ask the ADMIN information about one or more gates. The information may comprise the switches to open/close the gate, cameras that are associated with each gate, the MAC address of each gate, switch and camera, etc.

At block 214 the method 200 may ask information about one or more outdoor lighting. The information may comprise the switches to turn on/off the lighting, the MAC address of each switch, etc. Next, at block 216 information about one or more outdoor devices can be requested. The outdoor devices or items can comprise the pump of the swimming pool, the thermometer and the thermostat of the water of the swimming pool, the irrigation system, etc. information for activating/deactivating a certain item, habits of the tenant in relation to a certain device, etc.

Further devices may comprise the security sensors, output of the one or more cameras, etc. Finally at block 218 information about relevant vehicles can be asked. The relevant vehicles can comprise vehicles of one of the tenants, one or employee, etc. The information may comprise one or more images of the vehicle, instruction for opening the gates, common time of arriving/leaving, etc.

After collecting the information that is related to the outdoor, at block 219 process 200 may prepare an outdoor-association list. An example of an outdoor-association list may comprise the list of all the items that are located outdoor. Per each Item the list comprises its MAC address, the MAC address of the switches and sensors that are related to the item, the commands that can be used in order to activate/deactivate the device, reading from outdoor sensors, etc.

Asking information about indoor may start at block 230. At block 232 method 200 may ask for information about the number of floors. Next, per each floor, information about the number of spaces can be requested. The term space can comprise any rooms, kitchen, bath room, corridors, stairs, etc. Per each space, information about doors, lighting, locks, security sensors, allowed personal etc. can be requested 236. Next, at block 238 information about the devices/items that are located at each space can be added. At the end of this branch an indoor association list can be created 239. The association list can comprise the MAC address of each item, the MAC address of related switches and sensors, rules for activating/deactivating the device, the location in the house, etc.

The last branch, blocks 250 to 258, deals with people. At block 252 process 200 requests information related to the residents of the house. The information may comprise images from one or more indoor and outdoor cameras, voice signatures from one or more microphones, security code if exist, associated vehicle, cellular phone, habits of that tenant, etc. The habits may comprise common time for leaving or arriving home, common time for eating, preferred temperature, humidity, and lighting, etc.

At block 254 information about one or more indoor employees can be requested. The information may comprise images, voice signatures, the days and the hours, in which the employee work at that smart-home, the spaces in which the employee is allowed to be, actions that the employee can perform, etc. At block 256 information about outdoor employees can be requested. The information can be similar to the information that is requested for an indoor employee. Finally at block 258 a profile can be created per each person that is related to the house. At this point process 200 can be terminated.

The collect information can be stored in HSYSDB 1211 (FIG. 1) and can be uploaded to the CSYS 130 to be stored in the CDB 134*a-c* in the section that was allocated to the relevant HSYS 120*a-c*. Later on the stored information can be used by one of the MLC 136*a-c* for preparing one or statistical models for that smart home. In alternate embodiment the stored data in HSYSDB 1211 can be used by the CHUB 121 for creating the activating/deactivating models for the devices of that home.

In some embodiments, the CHUB 121 (FIG. 1) can be configure to execute process 200 or part of it during the ongoing-phase, for a certain HSYS 120*a-c* in certain occasions. Some of the occasions can be initiated by the ADMIN of the HSYS 120*a-c*. Following are few examples of such occasions: replacing an employee may lead the ADMIN to execute the branch from blocks 250 to 258; adding a new indoor-item or outdoor-item may lead the ADMIN to execute blocks 230-239 or 210 to 219, respectively, etc.

Figure 3:
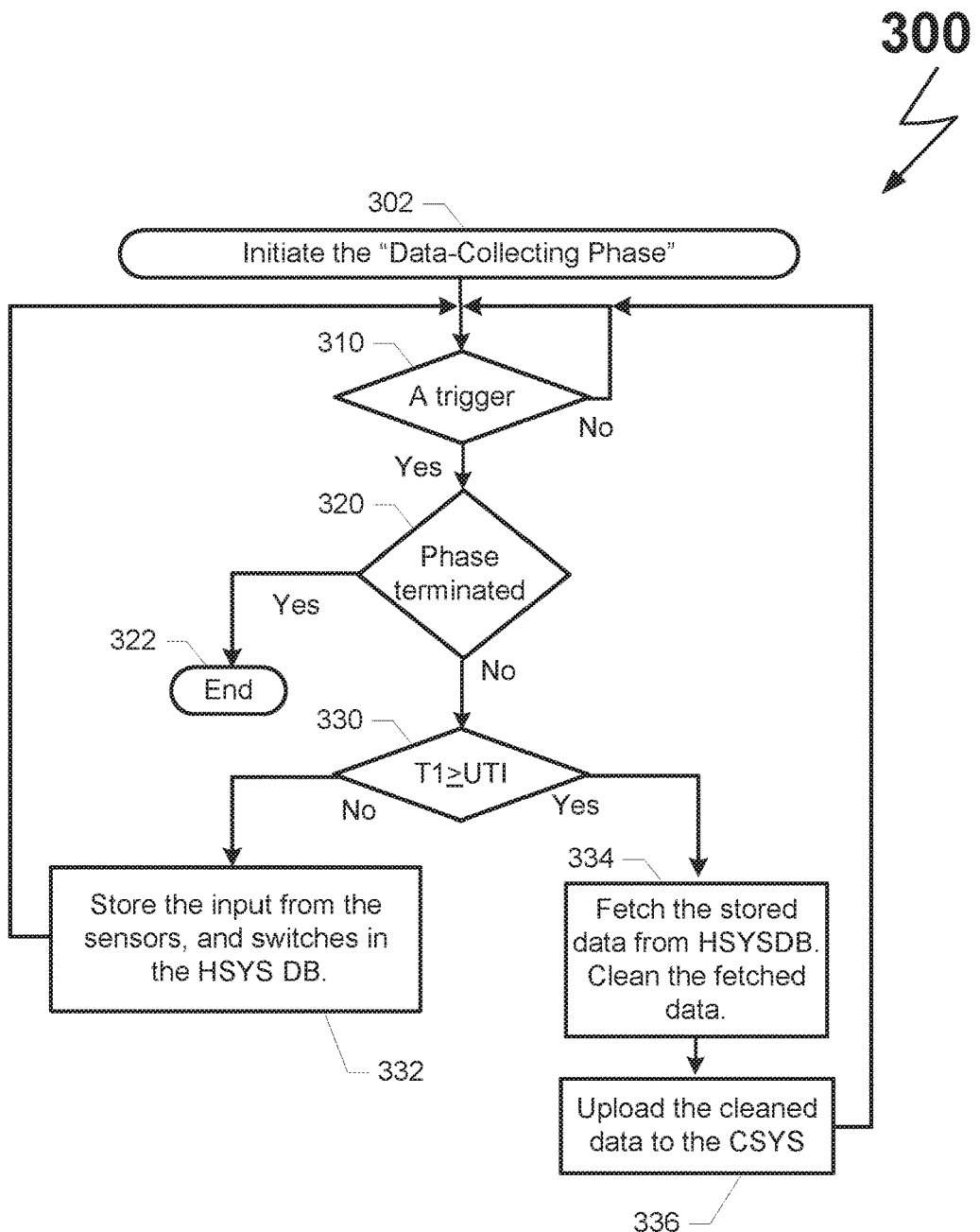
FIG. 3 illustrates a flowchart with relevant actions that can be implemented by an example of HSYS during "Data-collecting phase" of an example of a novel home automation system.

FIG. 3 illustrates a flowchart with relevant actions of an example process 300 that can be implemented by an example of HSYS 120*a-c* (FIG. 1) during "Data-collecting phase" of an example of a novel home automation system. During initiation 302 process can set few registers, counters, the local time, the correct date, an upload timer T1, etc. Timer T1 can be used for measuring the time interval between uploading data to the CDB 134*a-c*, etc. Next process 300 may wait 310 for a trigger.

Upon obtaining 310 a trigger a decision is made 320 whether the source of the trigger is the end of the "Data-Collecting Phase". In an example embodiment of process 300 the "Data-Collecting Phase" based on time, at the end of few weeks. The number of weeks can be in the range of three to ten weeks, for example. A common number can be five weeks. Alternate embodiment of process 300 can be terminated 320 upon collecting sufficient data that is needed in order to create the statistical models having success-rate (SR) that is higher than a certain threshold. If 320 the decision is yes, then process 300 can be terminated 322 and the CHUB 121 can send indication to the CSYS 130 that the "Data-Collecting Phase" was terminated.

If 320 the decision is that the "Data-Collecting Phase" was not terminated, which means that the trigger can be received from one of the indoor or outdoor sensors (1254*a-c*, or 1234*a-c* or 159*a-c*, FIG. 1); or from one of the switches (1252*a-c*, 1232*a-c*, 158*a-c*, FIG. 1); or by a command that was obtained from a mobile telephone or from a terminal; or from a timer that was configured to send a trigger every few minutes, five to ten minutes for example. In such a case at block 330 a decision is made whether the value of counter T1 is bigger than the value of the Upload-Time-Interval (UTI) threshold. If 330 no, then at block 332 an example of process 300 can store 332 in the HSYSDB 1211 (FIG. 1) the current input or reading of the indoor or outdoor sensors (1254*a-c*, or 1234*a-c* or 159*a-c*, FIG. 1); the current state of the switches (1252*a-c*, 1232*a-c*, 158*a-c*, FIG. 1) and the source of the trigger. After storing the collected data process 300 can return to block 310 waiting for the next trigger.

Other example embodiments of process 300 can be configured to "store and forward" the collected data to the CSYS 130 (FIG. 1). If at block 330 a decision is made that the value of counter T1 is equal or bigger than the value of UTI, then at block 334 the stored data from the HSYSDB 1211 (FIG. 1) is retrieved. In some embodiments, the retrieved data can be cleaned. The cleaning 334 process may comprise arranging the records in chronical order, removing records that have minor changes from adjacent records, etc. The cleaned data can be uploaded 336 via the Internet 140 to the CSYS 130 (FIG. 1) and be stored in CDB 134*a-c*. Then, process 300 may return to block 310 waiting for the next trigger.

Some example embodiments of process 300 may not include blocks 330, 334 and 336. In such embodiment process 300 may continue from block 320 directly to block 332. In such embodiment block 332 may be modified to include the actions of cleaning the stored records and uploading the stored data toward the CDB 134*a-c* instead of HSYSDB 1211.

Yet, in some embodiments of the present disclosure the home automation system 100 may not comprise the CSYS 130. In such embodiment blocks 330, 334 and 336 can be removed and process 300 can be configured to continue from block 320 directly to block 332.

Furthermore, some embodiments of process 300 can be modified by removing blocks 330 and 332, and amending the process to continue from block 320 to block 334 in which the fetched data is cleaned and be uploaded 336 toward the CSYS 130 to be stored in CDB 134*a-c*. In such embodiment the HSYSDB is not involved in the "Data-Collecting Phase".

Figure 4:
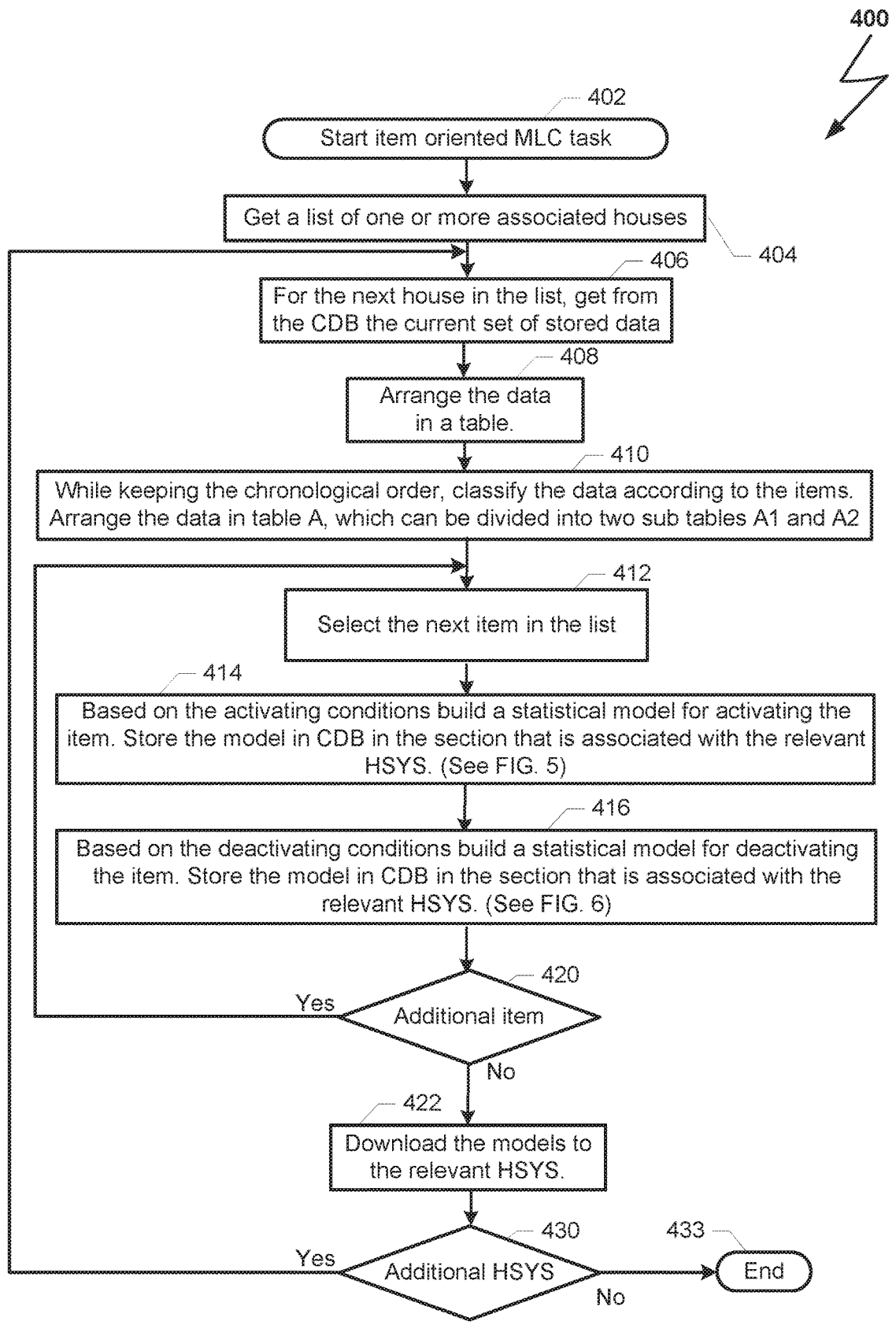
FIG. 4 illustrates a flowchart with relevant actions that can be implemented by an example of an MLC in a CSYS during "initial-processing phase (IPP)" in order to prepare a set of models for predicting when to activate or deactivate relevant devices/items of a HSYS.

FIG. 4 illustrates a flowchart with relevant actions of a process 400 for in preparing a set of statistical models for predicting when to activate or deactivate a devices/items of a HSYS 120 (FIG. 1). Process 400 can be implemented by an example of an MLC 136*a-c* (FIG. 1) during "initial-processing phase (IPP)". Process 400 can be initiated at the end of the "Data-Collecting Phase" and can run over the stored data that was collected during the "Data-Collecting Phase". An example of process 400 may have an external loop (blocks 406 to 430) that can be executed per each HSYS 120*a-c*. Each external loop may comprise an internal loop (blocks 412-420) that can be executed per each device/item of that HSYS 120.

During initiation 402 process 400 can set few registers with certain parameters, counters, the local time, the correct date, etc. Next process 400 may get 404 a list of one or more associated HSYS 120*a-c*, HSYS that are associated with the CSYS 130 (FIG. 1). The list may comprise identification information of the related home, the related section in CDB 134*a-c* which were allocated to store the collected data of the relevant home, the section that will be used to store the new created models of the relevant HSYS 120*a-c*, etc.

For the next HSYS 120*a-c* (FIG. 1) in the list, process 400 may retrieve 406 the stored data that was collected from the relevant HSYS 120*a-c*. The stored data can be arranged 408 in table A in a chronical order. The lines at table A can represent the time. The columns can be arranged 410 in two groups, the first group of columns can be allocated to devices/item, in which each column was allocated to a device/item. The second group of columns can be allocated to the sensors or switches, in which each column was allocated to a sensor/switch and can be used to store the reading or the state of that sensor/switch during the relevant time (the relevant line).

Then, table A can be divided 410 into two tables A1 and A2. Table A1 can comprise about 70% to 80% of the records of table A and table A2 can comprise rest of the records, which represent the recent period. Based on the stored data in table A1 one or more statistical models can be created that reflects the contribution of the readings from the sensors, switches, cameras, etc. to state change of the item/device. Then, the created statistical model can be implemented on the stored data of table A2 and the predicted actions can be compared to the real actions that are written in the stored data of table A2 accordingly the success rate (SR) of the model can be calculated.

Next the internal loop can be initiated, at block 412 the next item in the list of items of the current HSYS 120*a-c* can be selected and two statistical models can be created based on the stored data of A1 that is related to the selected item. A statistical model for activating 414 the device and a statistical model for deactivating 416 the device. Block 414 is disclosed in details below in conjunction with FIG. 5 while block 416 for creating the deactivating model is disclosed below in conjunction with in FIG. 6.

After creating and storing the statistical models of the current device in CDB 154*a-c* in the section that is related to the relevant HSYS 120*a-c* (FIG. 1) a decision is made 420, whether additional devices are included in the list of devices. If yes, then process 400 returns to block 412 for handling the next device/item. If no additional device is included in the list of devices, then the created models can be fetched from the CDB 134*a-c* and be downloaded 422 to the relevant HSYS 120*a-c* to be stored in HSYSDB 1211 (FIG. 1). In the present disclosure the terms device and item can be used interchangeably.

In some embodiments of process 400, downloading the created predicting models can be done after creating each model, as the last action of blocks 414 and 416. In such embodiment block 422 and its related actions can be eliminated.

Next, at block 430 a decision is made whether additional HSYS 120*a-c* (FIG. 1) exists in the list of associated home systems. If yes, then process 400 returns to block 406 for handling the next HSYS. If 430 no additional HSYSs is included in the list of HSYS, then process 400 can be terminated 433. During termination 433 the resources that were allocated to executing process 400 can be released.

Some example embodiment of the disclosed technique may not have the CSYS 130 (FIG. 1). In such embodiment each HSYS 120*a-c* can operate as individual system. In such embodiment the CHUB 121 can be configured to execute a modified process 400 instead of one of the MLC 136*a-c*. The modified process 400 may not include the actions that are related to the CSYS, actions that are related to blocks 404, 406 and 430. In order to execute the modified process 400 the CHUB 121 (FIG. 1) can be configured to move from block 402 directly to block 406 and collect the stored data from the HSYSDB 1211 (FIG. 1).

Blocks 408, 410 and 412 of the modified process 400, which is executed by the CHUB 121 (FIG. 1) of the corresponding HSYS 120*a-c* (FIG. 1), can be similar to the ones of process 400. In blocks 414 and 416 of the modified process 400 the created models can be stored in HSYSDB 1211 instead of CDB 134*a-c*. Blocks 422 and 430 of process 400 are not included in the modified process 400. Further, in the modified process 400 the decision, which can be made in block 420 for cases that there are no additional items, will be to terminate the modified process 400.

FIG. 5 illustrates a flowchart with relevant actions of process 500, which can be used for preparing an activating model that can predict when to activate a device or an item. Process 500 can be implemented by an example of an MLC 136*a-c* at CSYS 130. In some embodiments of the disclosed techniques, the MLC 136*a-c* at CSYS 130 can be configured to execute a plurality of processes 500 in parallel, one per each corresponding HSYS 120*a-c* (FIG. 1). In embodiments in which CSYS 130 does not exist, process 500 can be executed by the CHUB 121 of the corresponding HSYSs 120*a-c*.

During initiation 502 process 500 can set few registers with certain parameters, reset counter L, the local time, the correct date, etc. Counter L1 can count the number of loops that are executed in the process of creating the statistical model. An example of parameter can be the value of threshold P1 of the SR. The success rate (SR) of a calculated statistical model needs to be higher than the value of threshold P1 in order to be ready to use. Another parameter can be the value of NL1 which represents the maximum number of loops that can be executed in order to create a statistical model.

At block 506 table A can be scanned looking for lines in which the relevant item, the item that will be activated by the created model, change state from off to on. Those lines and a group of lines before each of those lines can be marked. The group of marked lines can represent a period of time before the case that the state of the device was changed from off to on. Next table M can be created 508 by coping the marked lines of table A. The period of time can be in the range of few minutes to few hours.

Next table M can be divided 510 into two sub tables M1 and M2, wherein M1 comprises the first set of lines of table M and M2 comprises the rest of the lines which represent the recent period. The recent period can be few weeks, in between two to four weeks, for example. M1 can have about 70% to 90% of the lines of table M, the first 80% of the lines of table M can be allocated to table M1, for example.

At block 512 based on the data stored in table M1 a statistical model for predicting when to activate the device can be created. The statistical model can reflect the contribution of the readings from each one of the sensors, switches, cameras, etc. on changing the state of the device. Thus, the coefficient of each of the readings from the sensors, switches, cameras, etc. can reflect the correlation between that switch, sensor, camera and the activation of the relevant device/item. Some of the coefficient can be zero.

Next, the created statistical activating model can be tested 514 in the background by implementing it on the stored data of table M2. The predicted action can be stored in a new column of table M2. Then, the predicted actions can be compared 514 to the real actions that are stored in table M2. Accordingly the success rate (SR) of the model can be calculated 516. At block 520 a decision is made whether the value of SR is equal or greater than the parameter P1. The value of P1 can be in the range of 60-80%, for example, a common value can be 75%, for example.

If 520 the value of SR is higher than P1, then Process 500 may store 522 the created model in CDB 134a-c (FIG. 1) in the section that was allocated to the relevant HSYS 120a-c. Then, the created model can be downloaded to the HSYSDB 1211 of the relevant HSYS 120a-c and process 500 can be terminated 540 while releasing the resources that were allocated to executing the process.

In embodiments in which the CSYS 130 does not exist, the CHUB 121 (FIG. 1) of the relevant HSYS 120a-c can be configured to create the activating statistical model of that item. In such embodiment, block 522 can be modified to include the action of storing the created model in HSYSDB 1211 of the relevant HSYS 120a-c and process 500 can be terminated 540 while releasing the resources that were allocated to executing process 500.

Returning now to block 520, If 520 the value of SR is smaller than P1, then Process 500 may increase 524 the value of counter L1 by one (L1=L1±1) and a decision can be made 530 whether the new value of L is bigger than the parameter NL1. Wherein the parameter NL1 reflects the number of correcting loops that process 500 is configured to execute. The value of NL1 can be in the range of 3-8 loops. A common value of NL1 can be 5 loops, for example. If 530 the new value of L is bigger than NL1, then a message 532 can be delivered that process 500 fails to create a statistical model that can predict the activation of the relevant item. Next, process 500 can be terminated 540 while releasing the resources that were allocated to executing process 500.

If 530 the new value of L1 is not higher than NL1, then at block 534 table M2 can be search looking for columns that correlate with the difference between the real activating of the device and the predicted action. Those columns can be marked 534 as mandatory columns (MCOL) and process 500 proceed to block 552. At block 552 one or more parameters can be changed and process 500 returns to block 510 for additional trial to find a valid statistical activating model for that device. The one or more parameters that can be change may comprise: a higher statistical coefficient to the MCOL, changing the value of NL1, changing the value of P1, changing the ratio between the number of lines in M1 and M2, etc.

In some embodiments of the disclosed technique process 500 can be implemented by using a machine-learning program (MLP). In such a case blocks 506 to 552 can be implemented by the MLP. A non-limiting example of a MLP can be based on "TensorFlow" maintained by Google Bain Team USA.

FIG. 6 illustrates a flowchart with relevant actions of process 600, which can be used for preparing a deactivating model that can predict when to turn off a device or an item. Process 600 can be implemented by an example of an MLC 136a-c (FIG. 1) at CSYS 130. In some embodiments of the disclosed techniques, the MLC 136a-c at CSYS 130 can be configured to execute a plurality of processes 600 in parallel, one per each corresponding HSYS 120a-c (FIG. 1). In some examples of embodiment of system 100 (FIG. 1) in which CSYS 130 does not exist, process 600 can be executed by the CHUB 121 of the corresponding HSYSs 120a-c (FIG. 1).

During initiation 602 process 600 can set few registers with certain parameters, reset counter L2, set the local time, the correct date, etc. Counter L2 can counts the number of loops that are executed in the process of creating the statistical model. An example of a parameter can be the value of threshold P2 of the SR. The success rate (SR) of a calculated statistical model needs to be higher than the value of P2 in order to be ready to use. Another parameter can be the value of NL2, which represents the maximum number of loops that can be executed in order to create a statistical model.

At block 606 table A can be scanned looking for lines in which the relevant item, the item that will be deactivated by the created model, change state from on to off. Those lines and a group of lines before each of those lines can be marked. The group of marked lines can represent a period of time before the case that the state of the device was changed from on to off. Next table N can be created 608 by coping the marked lines of table A. The period of time can be in the range of few minutes to few hours.

Next table N can be divided 610 into two sub tables N1 and N2, wherein N1 comprises the first set of lines of table N and N2 comprises the rest of the lines which represent the recent period. The recent period can be few weeks, in between two to four weeks, for example. N1 can have about 70% to 90% of the lines of table N, the first 80% of the lines of table N can be allocated to table N1, for example.

At block 612 based on the data stored in table N1 a statistical model for predicting when to deactivate the device can be created. The statistical model can reflect the contribution of the readings from each of the sensors, switches, cameras, etc. on changing the state of the device. Thus, the coefficient of each of the readings from the sensors, switches, cameras, etc. can reflect the correlation between that switch, sensor, camera and the activation of the relevant device/item. Some of the coefficient can be zero.

Next, the created statistical deactivating model can be tested 614 in the background by implementing it on the stored data of table N2. The predicted action can be stored in a new column of table N2. Then, the predicted actions can be compared 614 to the real actions that are stored in table N2. Accordingly, the success rate (SR) of the model can be calculated 616. At block 620 a decision is made whether the value of SR is equal or greater than the parameter P2. The value of P2 can be in the range of 60-80%, for example, a common value can be 75%, for example.

If 620 the value of SR is higher than P2, then Process 600 may store 622 the created model in CDB 134a-c (FIG. 1) in the section that was allocated to the relevant HSYS 120a-c. Then, the created model can be downloaded to the HSYSDB 1211 of the relevant HSYS 120a-c and process 600 can be terminated 640 while releasing the resources that were allocated to executing the process.

In embodiments in which the CSYS 130 does not exist, the CHUB 121 (FIG. 1) of the relevant HSYS 120a-c can be configured to create the activating statistical model of that item. In such embodiment, block 622 can be modified to include the action of storing the created model in HSYSDB 1211 of the relevant HSYS 120a-c and process 600 can be terminated 640 while releasing the resources that were allocated to executing process 500.

Returning now to block 620, If 620 the value of SR is smaller than P2, then Process 600 may increase 624 the value of counter L2 by one (L2=L2+1) and a decision can be made 630 whether the new value of L2 is bigger than the parameter NL2. Wherein the parameter NL2 reflects the maximum number of correcting loops that process 600 is configured to execute. The value of NL2 can be in the range of 3-8 loops. A common value of NL2 can be 5 loops, for example. If 630 the new value of L2 is bigger than NL2, then a message 632 can be delivered that process 600 fails to create a statistical model that can predict the deactivation of the relevant item. Next, process 600 can be terminated 640 while releasing the resources that were allocated to executing process 600.

If 630 the new value of L2 is not higher than NL2, then at block 634 table N2 can be search looking for columns that correlate with the difference between the real deactivating of the device and the predicted action. Those columns can be marked 634 as mandatory columns1 (MCOL1) and process 600 proceed to block 652. At block 652 one or more parameters can be changed and process 600 returns to block 610 for additional trial to find a valid statistical deactivating model for that device. The one or more parameters that can be change may comprise: a higher statistical coefficient to the MCOL1, changing the value of NL2, changing the value of P2, changing the ratio between the number of lines in N1 and N2, etc.

In some embodiments of the disclosed technique 600 can be implemented by using a machine-learning program (MLP). In such a case blocks 606 to 652 can be implemented by the MLP. A non-limiting example of a MLP can be based on "TensorFlow" maintained by Google Bain Team USA.

Some example embodiments of the disclosed technique may combine the process 500 for creating an activating model with process 600 for creating the deactivating model in order to create a combined-model. An example of a combined-model may replace the termination block 540 of process 500 with the initiation block 602 of process 600. Thus, upon reaching block 640 the combined model is ready to be used.

Some example embodiments of the disclosed technique may use a MLP in order to define the appropriate value of one or more parameters. Parameters such as but not limited to NL1 and NL2, P1 and P2, the ratio between M1 and M2, or N1 and N2, the period of the data collecting phase, etc.

Figure 7:
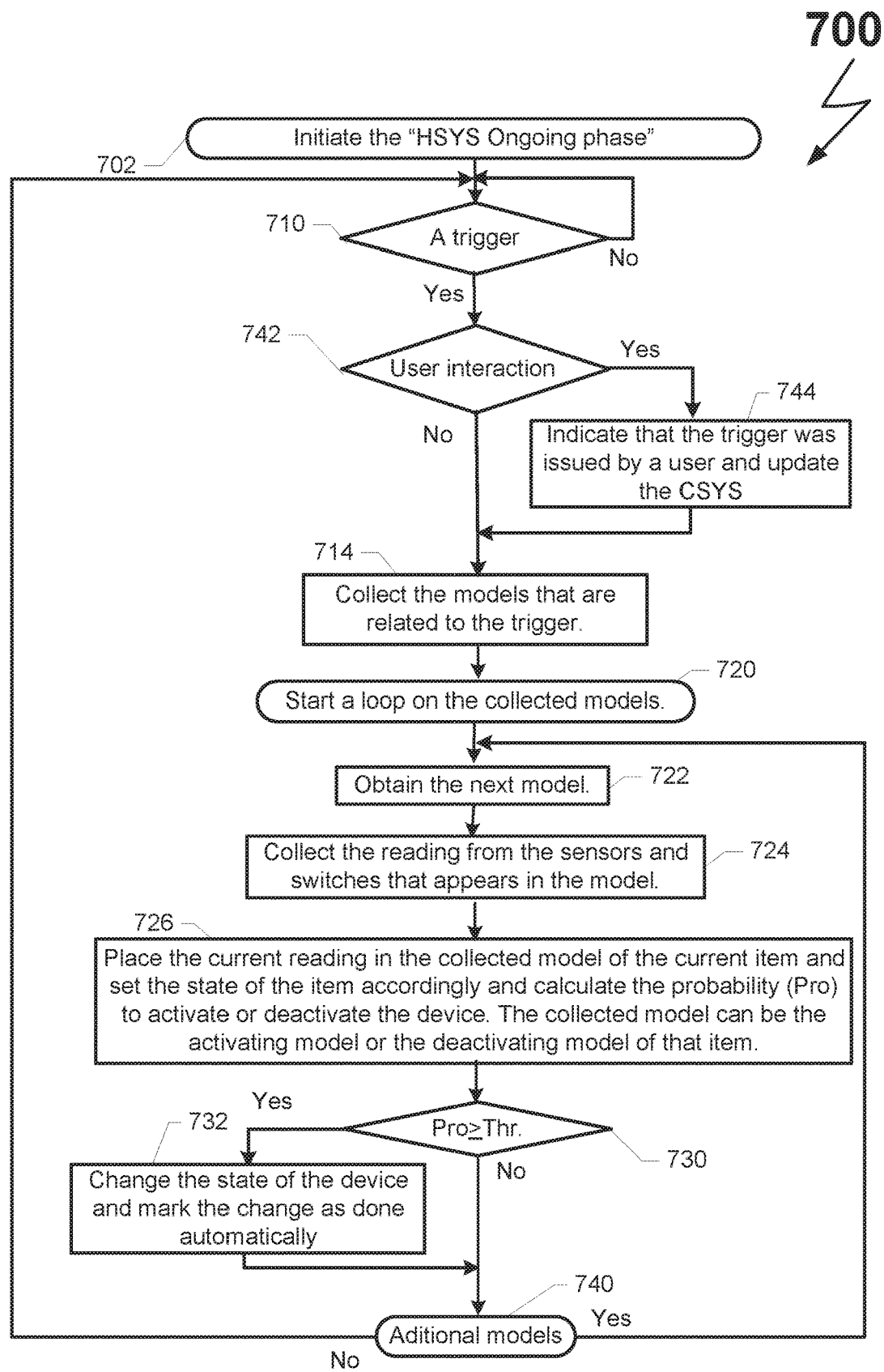
FIG. 7 illustrates a flowchart with relevant actions that can be implemented by an example of a HSYS during the "Ongoing phase" of an example of the novel home automation system.

Referring now to FIG. 7 that illustrates a flowchart with relevant actions of a process 700. Process 700 can be implemented by an example of a CHUB 121 (FIG. 1) during the "Ongoing Phase". The ongoing phase can be initiated 702 at the end of the initial processing phase (IPP). At this point of time the activating and the deactivating models of the relevant items of the related HSYS 120*a-c* are stored in the HSYSDB 1211 and are ready to be loaded to the CHUB 121.

Upon loading 702 the relevant activating and deactivating models, process 700 may wait 710 for a trigger. The trigger can be generated by one of the sensors 1254*a-c*, 1234*a-c*, or 159*a-c* (FIG. 1); or by one of the switches 1252*a-c*, 1232*a-c*, 158*a-c*; or from a mobile phone, or a terminal, or from a timer that can be set to send a trigger every few minutes. The timer can send a trigger every 1-10 minutes; a common value can be every 5 minutes, for example.

Upon obtaining 710 a trigger a decision is made 712 whether the trigger was issued by a user. If the decision was made by a user, then at block 714 an indication that the trigger was made by a user and the CHUB 121 (FIG. 1) may be added and CSYS 130 can be updated and process 700 can proceed to block 714.

If 712 the trigger was not issued by a user, then at block 714 the models that are related to the trigger can be fetched 714 from the HSYSDB 1211 (FIG. 1) and be loaded to the CHUB 121. The related models can be models in which the trigger can influence the probability to activate or deactivate a certain device. If the trigger is initiated from the timer than all the models are relevant. Next, a loop can be initiated 720. Each cycle of the loop (722-740) is dedicated to one of the collected models.

At block 722 the next model is obtained. Next, the reading 724 of the sensors 1254*a-c*, 1234*a-c*, or 159*a-c* (FIG. 1) that appears in the current model as well as the current state of the switches 1252*a-c*, 1232*a-c*, 158*a-c*, are collected 724 and be placed 726 in the current model. Based on the current model the probability to activate or deactivate the current item is calculated. At block 730 a decision is made whether the calculated probability (Pro) is higher than the value of a threshold (Thr) for changing the state of the device. A common value of such a threshold can be in the range between 50% to 80%, a common value can be 65%.

If the calculated Pro is not greater than Thr, then process 700 may proceed to block 740 checking whether additional models exist. If yes process 700 returns to block 722 for handling the next model. Some example embodiments may use two or more value of thresholds. The value of the threshold may relate to the device and to the model. The value of the threshold can reflect the willingness of the user to bad decisions of the automatic system.

If at block 730 the decision is yes, then the state of the device can be changed 732, from off to on or from on to off, depending on the current state, and accordingly a command can be sent to the relay or to the controller of that device. Further, and indication can be added that the change of the state of the device was done automatically. Next, process 700 proceeds to block 740 checking whether additional models exist.

If 740 there are no additional models, then process 700 can return to block 710 and wait for a trigger. If 740 there is an additional model, then process 700 may return to block 722 and load the next model from the HSYSDB 1211 (FIG. 1).

The present disclosure discloses few examples of systems and methods that can be implemented by a smart-home automation system. Some examples disclose a system that having a CSYS 130 (FIG. 1) and a plurality of HSYS 120*a-c*. Some embodiments of the disclosed technique may have one or more HSYS 120*a-c* without the CSYS 130.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A system for a smart home comprising:
a central hub comprising one or more hardware processors and communicatively coupled via one or more local networks with one or more sensors, one or more switches, and one or more items within the smart home, the central hub configured to:
train, for each item of the one or more items within the smart home, a corresponding machine-learned model based on previous states of the item and based on previous common actions taken by a plurality of users with respect to the item;
validate, for an item within the smart home, the machine-learned model by 1) identifying, for a most-recent interval of time, a set of states of the item during the most-recent interval of time, 2) generating a predicted set of states for the item during the interval of time using the machine-learned model, 3) comparing the predicted set of states to the identified set of states, 4) validating the machine-learned model in response to one or more comparison metrics being satisfied by the comparison, and 5) re-training the machine-learned model in response to one or more comparison metrics not being satisfied by the comparison at least in part by increasing the most-recent interval of time used to validate the machine-learned model;
identify one or more conditions associated with a validated machine-learned model and satisfied by a corresponding item within the smart home and a corresponding common action taken by the plurality of users; and
change a state of the corresponding item, the state selected based on the validated machine-learned model and the identified one or more conditions; and
a database storing each trained machine-learned model.

2. The system of claim 1, wherein the machine-learned model is configured to predict when to activate the corresponding item.

3. The system of claim 1, wherein the machine-learned model is configured to predict when to deactivate the corresponding item.

4. The system of claim 1, wherein the one or more conditions are identified by data received from the one or more sensors.

5. The system of claim 1, wherein the one or more conditions are identified by data received from the one or more switches.

6. The system of claim 1, wherein the one or more conditions are identified by data received from one or more relays or one or more locks.

7. The system of claim 1, wherein the one or more conditions comprises one or more of a temperature condition, a humidity condition, a lighting condition, a time condition, and an occupancy condition.

8. The system of claim 1, wherein training a machine-learned model comprises:
collecting, from the one or more sensors or the one or more switches, a first set of data associated with a first time interval and a second set of data associated with a second time interval subsequent to the first time interval;
determining that the corresponding item is in a first state during the first time interval and a second state during the second time interval; and
identifying, based on the first set of data and the second set of data, a first set of conditions satisfied by the corresponding item when the corresponding item is in the first state and a second set of conditions satisfied by the corresponding item when the corresponding item is in the second state.

9. The system of claim 8, wherein the first set of data and the second set of data are representative of interactions with the corresponding item by a user.

10. The system of claim 8, wherein the first set of data and the second set of data are representative of one or more events occurring with regards to the corresponding item.

11. A method comprising:
training, for each item of one or more items within a smart home, a corresponding machine-learned model based on previous states of the item and based on previous common actions taken by a plurality of users with respect to the item;
storing each trained machine-learned model within a database associated with the smart home;
validating, for an item within the smart home, a corresponding machine-learned model by 1) identifying, for a most-recent interval of time, a set of states of the item during the most-recent interval of time, 2) generating a predicted set of states for the item during the interval of time using the machine-learned model, 3) comparing the predicted set of states to the identified set of states, 4) validating the machine-learned model in response to one or more comparison metrics being satisfied by the comparison, and 5) re-training the machine-learned model in response to one or more comparison metrics not being satisfied by the comparison at least in part by increasing the most-recent interval of time used to validate the machine-learned model;
identifying, by a central hub comprising one or more hardware processors, one or more conditions associated with the validated machine-learned model and satisfied by a corresponding item and a corresponding common action taken by the plurality of users within the smart home, the central hub communicatively coupled via one or more local networks with one or more sensors, one or more switches, and the one or more items; and
changing, by the central hub, a state of the corresponding item, the state selected based on the validated machine-learned model and the identified one or more conditions.

12. The method of claim 11, wherein the machine-learned model is configured to predict when to activate the corresponding item.

13. The method of claim 11, wherein the machine-learned model is configured to predict when to deactivate the corresponding item.

14. The method of claim 11, wherein the one or more conditions are identified by data received from the one or more sensors.

15. The method of claim 11, wherein the one or more conditions are identified by data received from the one or more switches.

16. The method of claim 11, wherein the one or more conditions are identified by data from one or more relays or one or more locks.

17. The method of claim 11, wherein the one or more conditions comprises one or more of a temperature condition, a humidity condition, a lighting condition, a time condition, or an occupancy condition.

18. The method of claim 11, wherein training a machine-learned model comprises:
- collecting, from the one or more sensors or the one or more switches, a first set of data associated with a first time interval and a second set of data associated with a second time interval subsequent to the first time interval;
- determining that the corresponding item is in a first state during the first time interval and a second state during the second time interval; and
- identifying, based on the first set of data and the second set of data, a first set of conditions satisfied by the corresponding item when the corresponding item is in the first state and a second set of conditions satisfied by the corresponding item when the corresponding item is in the second state.

19. The method of claim 18, wherein the first set of data and the second set of data are representative of interactions with the corresponding item by a user.

20. The method of claim 18, wherein the first set of data and the second set of data are representative of one or more events occurring with regards to the corresponding item.

* * * * *